Olney Fry Jr. Seeder.

74073

PATENTED FEB 4 1868

Witnesses:
Theo Tische
Wm Brown

Inventor:
O. Fry Jr.
per Munn & Co.
Attorneys

United States Patent Office.

OLNEY FRY, JR., OF ALBANY, OREGON.

Letters Patent No. 74,073, dated February 4, 1868.

---

IMPROVEMENT IN SEEDING-MACHINES.

---

The Schedule referred to in these Letters Patent and making part of the same.

---

TO ALL WHOM IT MAY CONCERN:

Be it known that I, OLNEY FRY, Jr., of Albany, in the county of Linn, and State of Oregon, have invented a new and improved Seeder; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
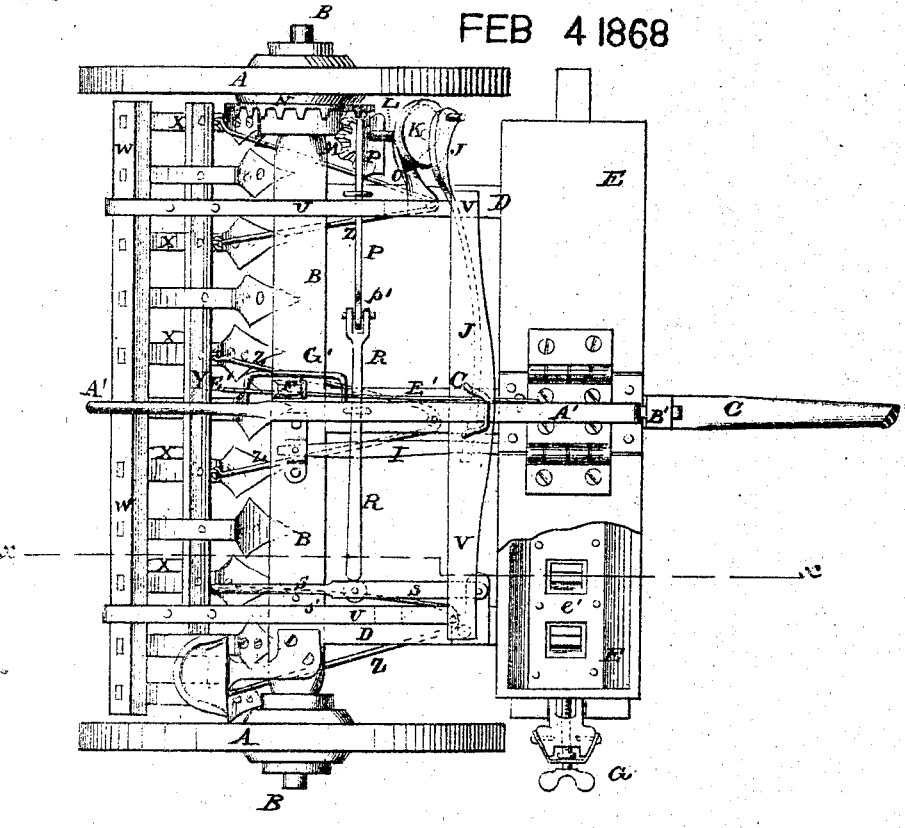
Figure 1 is a top or plan view of my improved machine.
Figure 2:
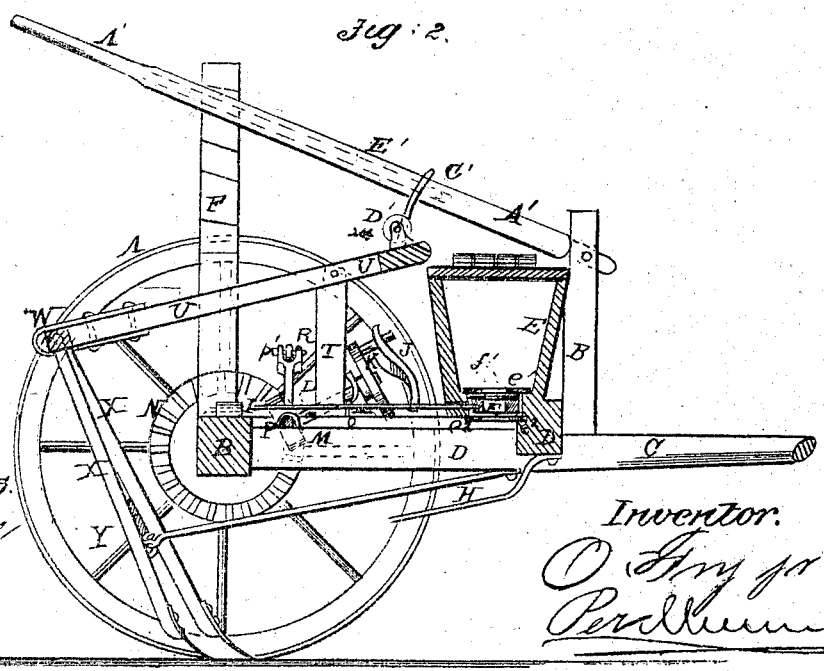
Figure 2 is a detail cross-section of the same, taken through the line $x\,x$, fig. 1.

My invention has for its object to furnish a simple, cheap, and effective machine for sowing grain broadcast, which shall sow the grain evenly and cover it at a uniform depth, thereby decreasing the labor and time required for putting in the grain, and at the same time increasing the yield; and it consists in the construction, combination, and arrangement of the various parts, as hereinafter more fully described.

A are the wheels, and B is the axle, to which the tongue C and frame D are attached. E is a continuous seed-box, extending across the machine from side to side, and securely attached to the frame D. The bottom of the seed-box E is slotted longitudinally, and is covered both upon its upper and lower sides with perforated plates $e^1$ and $e^2$, the holes in which are not opposite to each other. F is a perforated bar, which slides back and forth in the slotted bottom of the seed-box E, between the perforated plates $e^1$ and $e^2$, and which has a perforated plate, $f'$, upon its upper side. The plate $f'$ has tongues formed upon it, at the end edges of its holes or perforations, which project downwards into the holes in the bar F, so that by moving the plate $f'$ longitudinally upon the bar F, by means of the thumb-screw G, the size of the holes through the bar F may be made larger or smaller, according to the kind of grain to be sown, or the quantity required to be sown, to the acre. H is an inclined board or apron secured beneath the seed-box E in such a position as to receive the grain discharged from the seed-box, and insure its being evenly scattered over the ground. I is an arm or lever, the rear end of which is pivoted to the axle B or to some other fixed support, and the forward end of which passes in through a horizontal slot in the bottom of the seed-box E, and is connected to the bar F. J is a connecting-rod, one end of which is attached to the lever I, and the other end of which extends out to the left-hand side of the machine, and is pivoted to the crank-pin of the crank or crank-wheel K, attached to the forward end of the shaft L. To the rear end of the shaft L is attached a pinion-wheel, M, the teeth of which mesh into the teeth of the gear-wheel N, rigidly attached to the left-hand drive-wheel A, so that the sowing-device may be operated by the advance of the machine. The forward end of the shaft L revolves in bearings in the support O, rigidly attached to the frame D, and its rear end revolves in bearings in the end of the sliding bar P, which slides back and forth in keepers attached to the frame D. Upon the upper side of the sliding bar P is formed an ear or projection, $p'$, to which is pivoted one end of the connecting-rod R, the other end of which is pivoted to the lever S. The forward end of the lever S is pivoted to the frame D, and its rear end extends back into such a position that it may be conveniently reached and operated by the driver, either with his hand or foot, to throw the sowing-device into or out of gear with the drive-wheel. S' is a stop-pin, attached to the axle B in such a position that when the lever S is placed upon one side of said pin, the pinion-wheel M is locked in gear with the gear-wheel N, and when the said lever is placed upon the other side of the said pin, the said pinion-wheel will be locked out of gear with the said gear-wheel. T are short posts, the lower ends of which are secured to the frame D, and to the upper ends of which are pivoted the forward parts of the cross-bars U, the forward ends of which are connected by the longitudinal bar V. To the rear ends of the cross-bars U is pivoted the beam W, to which the upper ends of the plough-standards X are securely attached. The standards X pass down alternately upon the front and rear sides of the longitudinal bar Y, to which they are securely attached, and by which they are held in their proper relative positions. The draught-strain upon the ploughs is sustained by the draught-bars or rods Z, the rear ends of which are connected to the lower parts of the standards X that pass down in the rear of the bar Y, and the forward ends of which are connected to the frame D and tongue C. A' is a lever, the forward end of which is pivoted to a support, B', attached to the tongue C or frame D, and the rear end of which extends back into such a position as to be easily reached and operated by the driver. C' is a stirrup or keeper attached to the longitudinal bar V, and which passes around the lever A', so that the ploughs may be lowered by raising the rear end of the lever A'. The ploughs are raised by depressing the rear end of the lever A', which bears upon and presses down the beam or bar Y. The friction between the bar Y and the lever A' may be diminished by attaching a friction-roller, D', to the bar V for the lever A' to act upon. The lever A' may be secured in position to hold the ploughs up and down by the spring E' attached to the lever A', and which enters notches in the standard F', the lower end of which is secured to the axle B. The lever A' is kept in proper position for the spring E' to enter the notches in the standard F' by the keeper G' attached to the said lever, and which passes around the said standard.

I claim as new, and desire to secure by Letters Patent—

1. The combination of the gear-wheel N, attached to the drive-wheel A, pinion-wheel M, shaft L, crank or crank-wheel K, connecting-rod J, and lever I, with each other and with the seed-box E and adjustable sliding bar F, said seed-box and sliding bar being constructed and arranged substantially in the manner herein shown and described.

2. The combination and arrangement of the sliding bar P, connecting-rod R, and lever S, with each other and with the shaft L, substantially as herein shown and described, for the purpose of throwing the pinion-wheel M into and out of gear with the gear-wheel N.

3. The combination of the posts T, cross-bars U, longitudinal bar V, beam W, plough-standards X, bar Y, and draught-bars or rods Z, with each other and with the frame D and tongue C, said parts being constructed and arranged substantially as herein shown and described, and for the purpose set forth.

4. The combination of the keeper C', lever A', spring E', and notched standard F', with each other and with the longitudinal bar V, substantially as herein shown and described, and for the purpose set forth.

The above specification of my invention signed by me, this 9th day of September, 1867.

OLNEY FRY, Jr.

Witnesses:
A. B. COLVER
A. W. STANARD